United States Patent
Fretschner et al.

(10) Patent No.: US 6,691,969 B2
(45) Date of Patent: Feb. 17, 2004

(54) DEVICE FOR ADJUSTING THE INCLINATION OF A SEAT SURFACE PART OF A VEHICLE SEAT

(75) Inventors: Hans-Dieter Fretschner, Bodenwöhr (DE); Stefan Graf, Nabburg (DE); Richard Ott, Kümmersbruck (DE); Holger Raum, Sulzbach-Rosenberg (DE)

(73) Assignee: Grammer AG, Amberg (DE)

( * ) Notice: Subject to any disclaimer, the term of this patent is extended or adjusted under 35 U.S.C. 154(b) by 0 days.

(21) Appl. No.: 10/168,098

(22) PCT Filed: Dec. 9, 2000

(86) PCT No.: PCT/DE00/04407
§ 371 (c)(1),
(2), (4) Date: Jun. 11, 2002

(87) PCT Pub. No.: WO01/44008
PCT Pub. Date: Jun. 21, 2001

(65) Prior Publication Data
US 2003/0001062 A1 Jan. 2, 2003

(30) Foreign Application Priority Data
Dec. 15, 1999 (DE) .......................... 199 60 396

(51) Int. Cl.$^7$ .......................... A45D 19/04; A47J 47/16; F16M 13/00
(52) U.S. Cl. .................. 248/393; 248/371; 248/372.1
(58) Field of Search ................. 248/393, 394, 248/397, 291.1, 371, 372.1; 297/328

(56) References Cited

U.S. PATENT DOCUMENTS

| | | | | |
|---|---|---|---|---|
| 2,795,267 A | * | 6/1957 | Williams .................. | 248/394 |
| 3,692,271 A | * | 9/1972 | Homier et al. ............ | 248/394 |
| 3,695,570 A | | 10/1972 | Ishida ...................... | 248/397 |
| 3,853,295 A | * | 12/1974 | Cristin ..................... | 248/396 |
| 3,910,543 A | * | 10/1975 | Fourrey et al. ............ | 248/396 |
| 4,190,225 A | * | 2/1980 | Bauer et al. ............... | 248/394 |
| 4,513,937 A | * | 4/1985 | Langmesser, Jr. et al. .. | 248/394 |
| 4,765,582 A | * | 8/1988 | Babbs ....................... | 248/394 |
| 4,770,386 A | * | 9/1988 | Hessler et al. ............. | 248/393 |
| 5,918,714 A | | 7/1999 | Kadereit .................... | 192/15 |

FOREIGN PATENT DOCUMENTS

| | | | | |
|---|---|---|---|---|
| DE | 3022950 | | 2/1981 | |
| DE | 3540726 | | 5/1987 | |
| DE | 3810612 | | 10/1989 | |
| DE | 41 35 092 A1 | * | 4/1993 | ........... B60N/2/02 |
| DE | 19816248 | | 10/1999 | |
| EP | 720930 | | 7/1996 | |
| FR | 2 529 145 | * | 6/1982 | ........... B60N/1/06 |
| GB | 2 120 093 A | * | 5/1982 | ........... B60N/1/06 |

* cited by examiner

Primary Examiner—Ramon O. Ramirez
Assistant Examiner—Amy J. Sterling
(74) Attorney, Agent, or Firm—Elliot M. Olstein; Raymond J. Lillie

(57) ABSTRACT

Described is an apparatus for adjusting the inclination of a seat squab (12) of a vehicle seat (10), wherein the device (18) has a rocker (20) with an upper and a lower rocker element (22, 24) which are pivotably movably connected together by lateral bearing bushes (36). Fixed to the upper rocker element (22) is a toothed bridge (38) with mutually oppositely disposed bridge tooth arrangements (40) which are concentric with respect to the bearing bushes (36). Provided between the two bridge tooth arrangements (40) of the toothed bridge (38) are two toothed sliders (64) with slider tooth arrangements (66). Provided between the two toothed sliders (64) is a locking member (48) rotatable about a rotary axis (26) extending through the bearing bushes (36). The two toothed sliders (64) are linearly movably guided on the lower rocker element (24) between a locking position and a release and adjusting position. Provided between the rotary axis (26) and the lower rocker element (24) is a prestressed spring element (74) which urges the two toothed sliders (64) self-lockingly into the locking position.

8 Claims, 9 Drawing Sheets

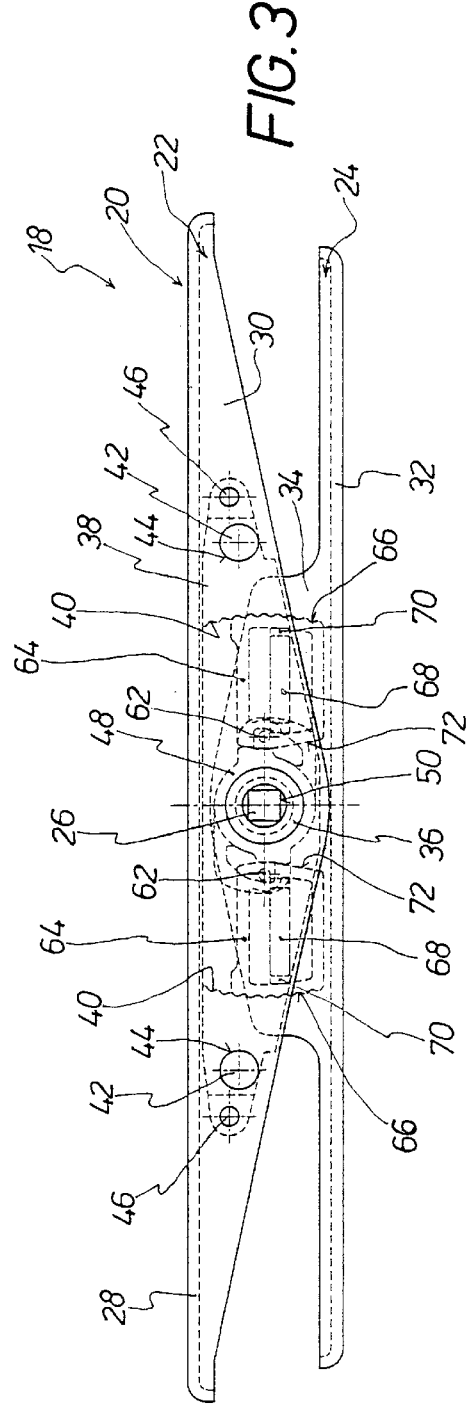

Figure 1:
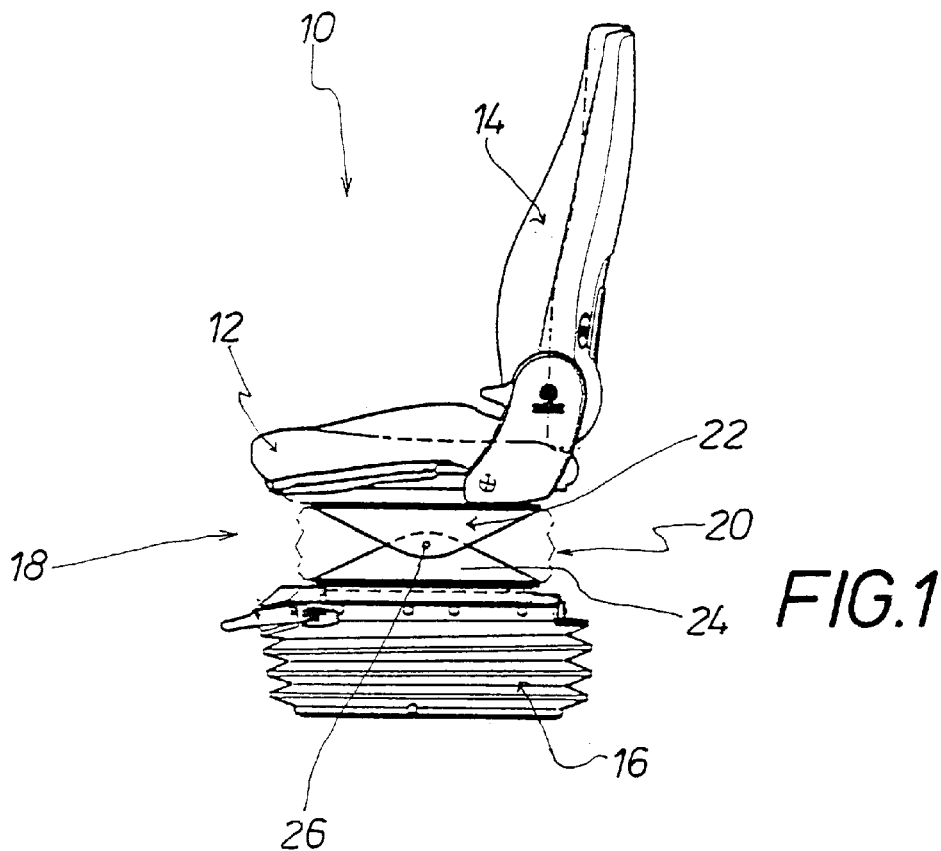

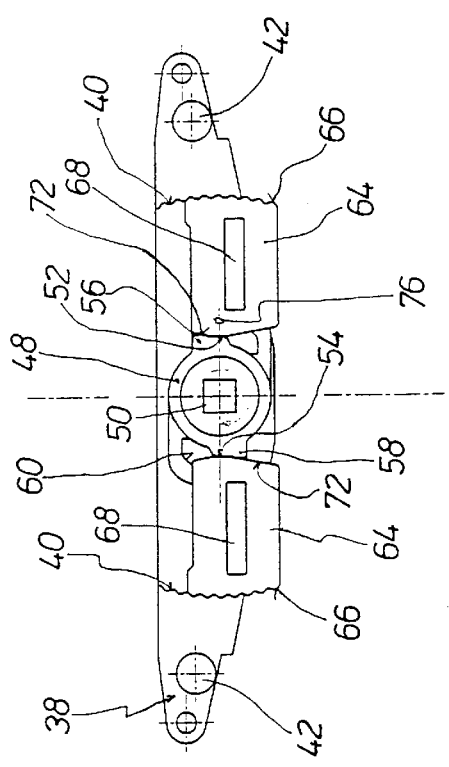
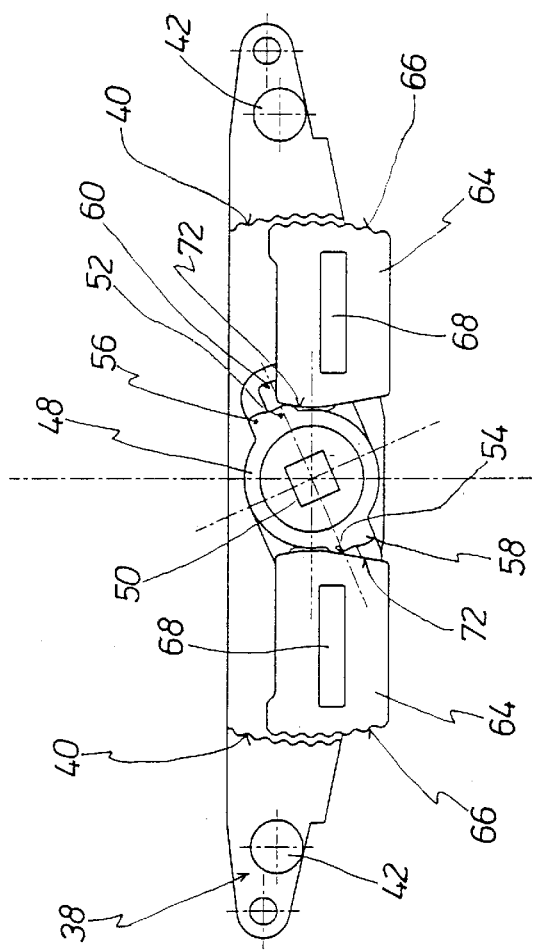

DEVICE FOR ADJUSTING THE INCLINATION OF A SEAT SURFACE PART OF A VEHICLE SEAT

The invention concerns an apparatus for adjusting the inclination of a seat squab of a vehicle seat.

An apparatus of that kind is known from DE 30 22 950 A. The vehicle seat involves in particular a truck seat, a tractor seat, a stacking truck seat, or a seat for a building machine.

Usually, such adjusting apparatuses of the kind set forth in the opening part of this specification are integral components of the respective vehicle seat, that is to say in production of the corresponding vehicle seat they are integrated into same.

The object of the present invention is to provide an adjusting apparatus of the kind set forth in the opening part of this specification, which is also suitable for subsequent fitment, that is to say for subsequent combination with a vehicle seat, and which, while being of a relatively simple structural configuration, requires only a small amount of space in the heightwise direction of the vehicle seat.

In accordance with the invention, in an apparatus of the kind set forth in the opening part of this specification, that object is attained in that there is provided a rocker having an upper and a lower rocker element which are pivotably movably connected together by lateral bearing bushes, that fixed to the upper rocker element is a toothed bridge with mutually oppositely disposed bridge tooth arrangements which are concentric with respect to the bearing bushes, and that provided between the two bridge tooth arrangements of the toothed bridge are two toothed sliders with slider tooth arrangements facing away from each other and provided between the two toothed sliders is a locking member rotatable about a rotary axis extending through the bearing bushes, wherein the two toothed sliders are linearly movably guided on the lower rocker element between a locking position of engaging into the bridge tooth arrangements and a release and adjusting position spaced from the bridge tooth arrangements, the locking member is provided for adjustment of the two toothed sliders between the release and adjusting position and the locking position, and provided between the rotary axis and the lower rocker element is a prestressed spring element which urges the two toothed sliders self-lockingly into the locking position.

The rocker of the adjusting apparatus according to the invention, with the upper and the lower rocker elements, is advantageously only of a small structural height so that the rocker can be disposed without any problem between the seat squab of a vehicle seat and a seat springing arrangement which is usual in relation to such vehicle seats. By virtue of its small structural height, the apparatus according to the invention has scarcely any influence, or only an unnoticeable influence, on the overall height of the corresponding vehicle seat. By means of the adjusting apparatus according to the invention, the seat squab of a vehicle seat can be adjusted for example through an order of magnitude of ±12 degrees relative to the horizontal, in small angular steps. This appropriately involves adjustment about a transverse axis of the seat, which is defined by the rotary axis. By means of suitable adaptor components, it is also possible to embody inclination of the seat transversely with respect to the direction of travel, that is to say about a longitudinal axis of the seat.

It has proven desirable for the upper and the lower rocker elements to be in the form of sheet metal parts. Those sheet metal parts may involve deep-drawn or stamped parts which are simple and inexpensive to produce.

Structurally simple and highly reliable fixing of the toothed bridge to the upper rocker element is afforded if the toothed bridge is centered on the upper rocker element by centering projections and fixed by means of fixing elements spaced therefrom. Those fixing elements may involve fixing screws or preferably rivets. By virtue of the centering projections which are spaced from the fixing elements and which project without play into associated holes in the upper rocker element, the respective forces are reliably transmitted from the seat squab of the vehicle seat to the upper rocker element and thus to the rocker.

In order to permit so-called 'sliding ratcheting' when the inclination of the seat squab of the vehicle seat is adjusted as desired, it is desirable if the bridge tooth arrangements of the toothed bridge and the slider tooth arrangements of the toothed sliders have wave-shaped tooth profiles.

It has proven to be advantageous if, in the case of the adjusting apparatus according to the invention, each of the toothed sliders has a back which is towards the locking member and if the locking member is provided with diametrally mutually oppositely disposed noses which bear against the back. The noses of the locking member and the backs of the toothed sliders are preferably designed in such a way that subsequent adjustment of the toothed sliders is made possible by means of the mechanically prestressed spring element disposed between the rotary axis and the lower rocker element, so that, even after a long period of operation of the adjusting apparatus according to the invention, any play which possibly occurs between the bridge tooth arrangements of the toothed bridge and the slider tooth arrangements of the toothed sliders is eliminated or at least reduced.

It is desirable if the lower rocker element is provided with guide slots which are aligned with each other in a line and if the two toothed sliders for displacement thereof between the locking position and the release and adjusting position are provided with guide bars which are linearly movably guided in the guide slots.

Guide slots of that kind can be produced in a simple and highly precise manner in the lower rocker element. The guide bars are desirably integral component parts of the toothed sliders. That affords an exact and robust structure with excellent operational reliability.

It is particularly advantageous if the backs of the toothed sliders and the noses of the locking member are designed in such a way that, in the locking position of the toothed sliders, the noses lie on a straight operative line which extends through the rotary axis of the rocker and which extends parallel to the guide slots or is provided in coincident relationship therewith. That advantageously ensures that external mechanical forces which are introduced into the toothed bridge through the upper rocker element of the rocker and which by way of the bridge tooth arrangements exert a force component on the slider tooth arrangements of the toothed sliders do not urge the toothed sliders out of the locking position. That above-mentioned positioning of the toothed sliders on the straight operative line provides for reliably restraining the toothed sliders in the locking position.

In the adjusting apparatus according to the invention, a respective projection can extend away from each of the two toothed sliders and the locking member can be provided with mutually diametrally opposite sliding guides, by means of which the two toothed sliders are adjustable upon release adjustment of the locking member by the projections against the force of the spring element, from the locking position into the release and adjusting position.

The projections are desirably integral component parts of the toothed sliders. The sliding guides of the locking member can be in the form of sliding guide slots.

In the adjusting apparatus according to the invention the rotary axis is of a cross-section which differs from a circular shape. This may involve a quadrangular or square cross-section. The locking member of the locking apparatus according to the invention can have a through hole, the internal cross-section of which is adapted to the cross-section of the rotary axis. If however the adjusting apparatus according to the invention is used not just at one side of the respective vehicle seat but at both sides, then the two locking members can be actuated by means of a common rotary axis. Under given conditions, such as possible twisting of the rocker due to high external forces, the situation may involve non-uniform latching engagement of the toothed sliders on one side of the vehicle seat and on the other side. A rigid connection of the locking members can under some circumstances result in 'latching beyond', beyond the position of inclination of the vehicle seat that the seat occupant actually wants. In order to avoid such 'latching beyond', the locking member can have a through hole whose internal cross-section is adapted to the cross-section of the rotary axis in such a way that limited angular rotary movement of the rotary axis relative to the locking member is possible. Such a configuration of the last-mentioned kind has the advantage that the locking members which are individually sprung by virtue of the limited angular rotary movement are pivotable with each other in the release direction, but in the event of a locking position not being implemented on one of the two sides of the vehicle seat, they can assume their locking position independently of each other.

The adjusting apparatus according to the invention which comprises a small number of individual parts is advantageously simple to produce and assemble and it is of excellent operational reliability, while being of a simple and robust design. A further substantial advantage is that its range of angle or inclination adjustment is great, with a small overall structural height.

Adjusting apparatuses for a vehicle seat backrest which is adjustable in respect of its inclination are known for example from DE 35 40 726 C2, DE 38 10 612 C2, U.S. Pat. No. 5,918,714, EP 0 720 930 A1 or DE 198 16 248 C1. All those known adjusting apparatuses for the backrest of a vehicle seat, with a round basic structure, require a relatively large amount of space or base area. As such a known adjusting apparatus is disposed between the backrest and the seat squab of a vehicle seat, that need for base area is not particularly relevant and it has no effect whatsoever on the overall height of the vehicle seat.

Figure 2:
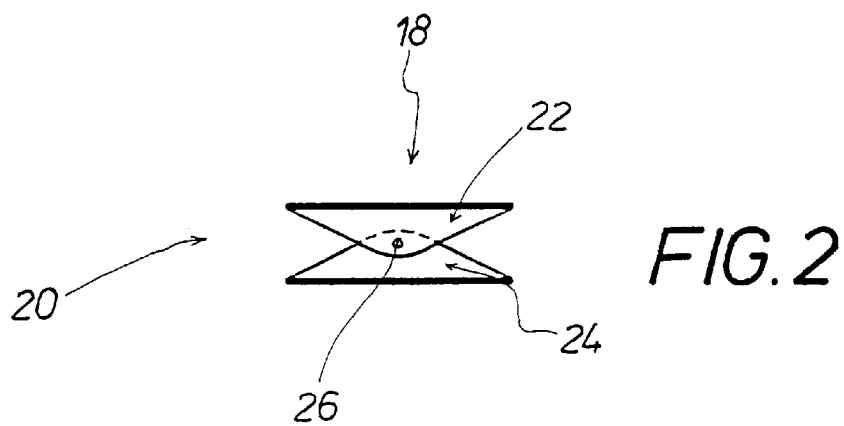
Figure 7:
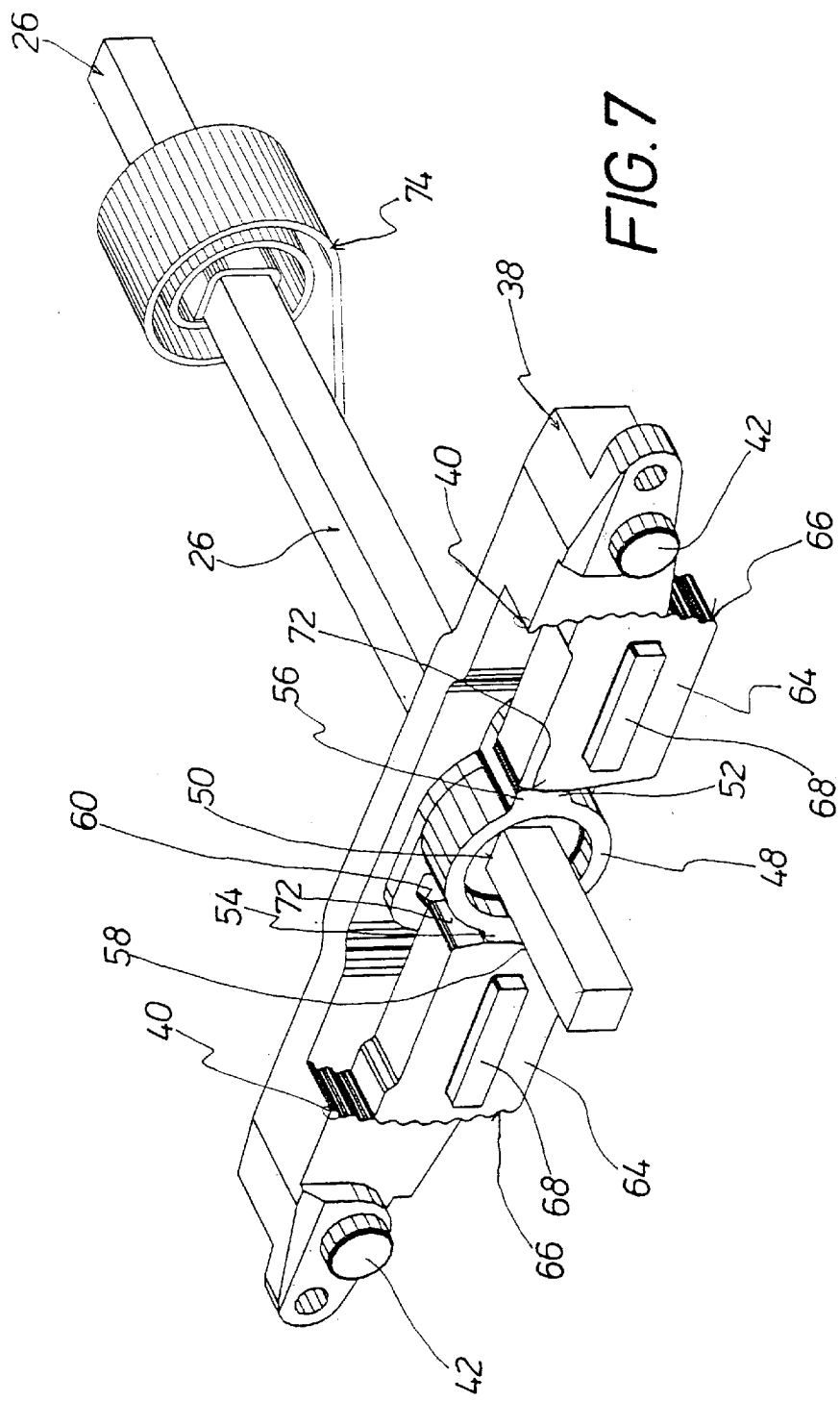
Figure 8:
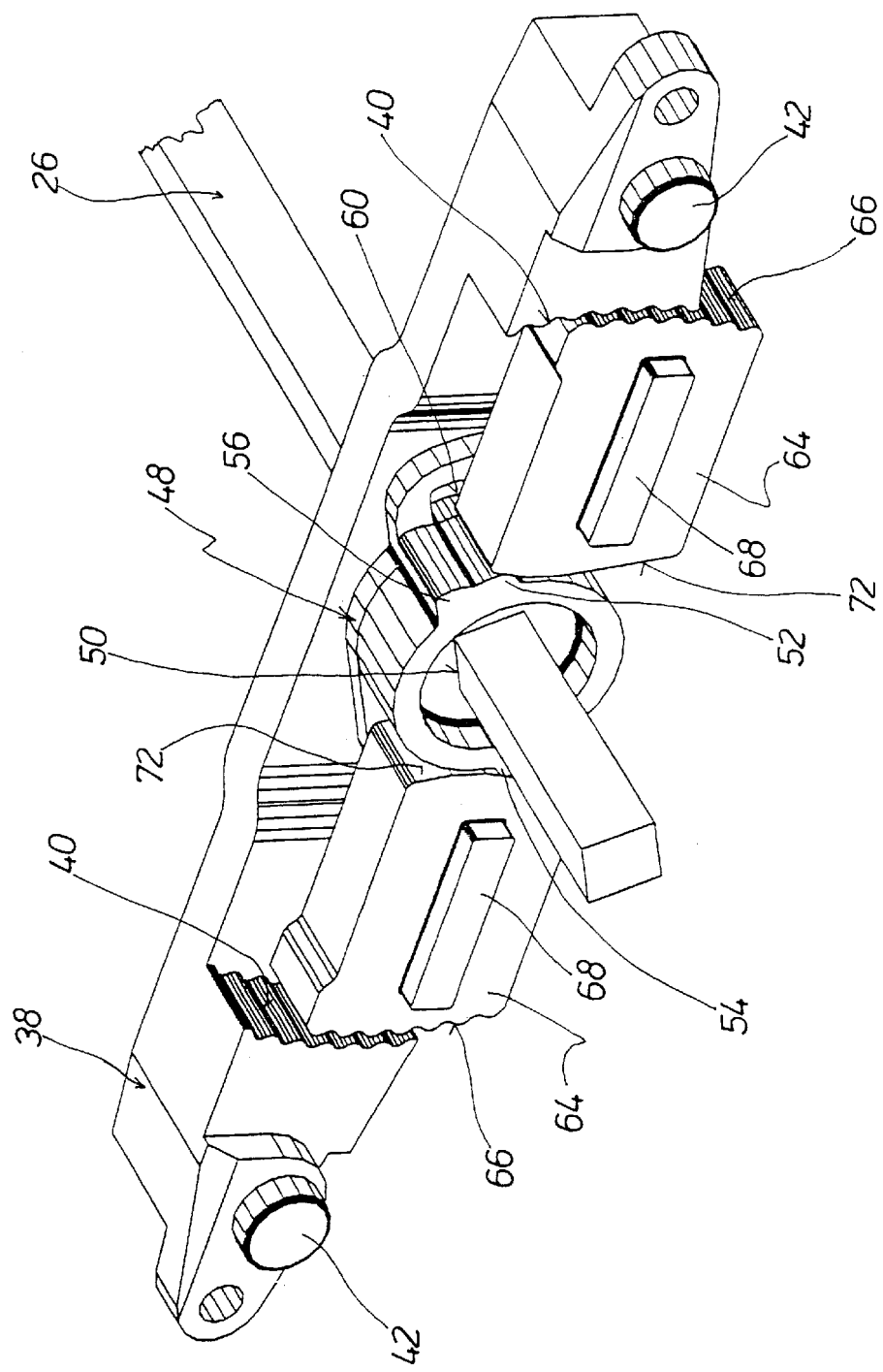
Figure 9:
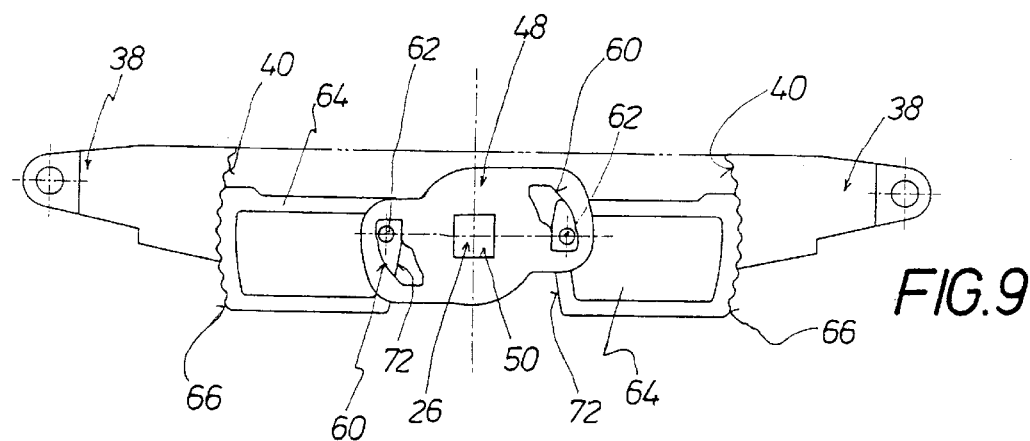
Figure 10:
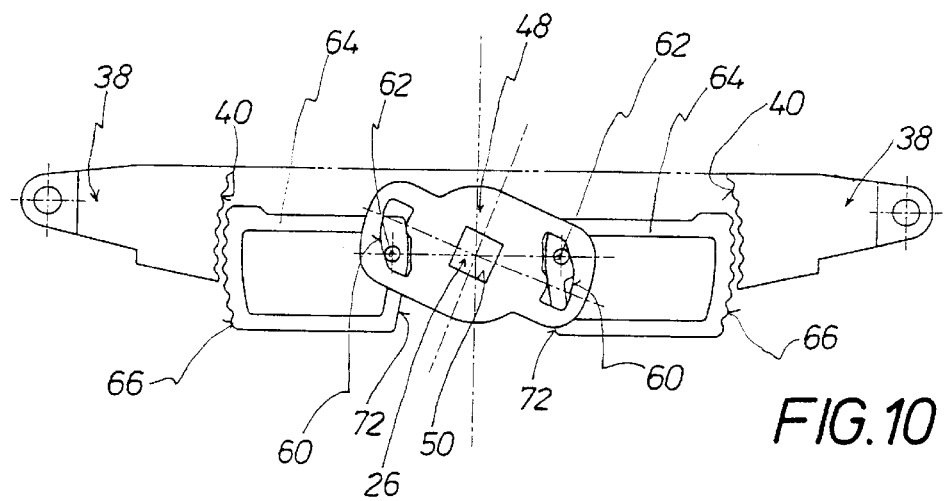
Figure 11:
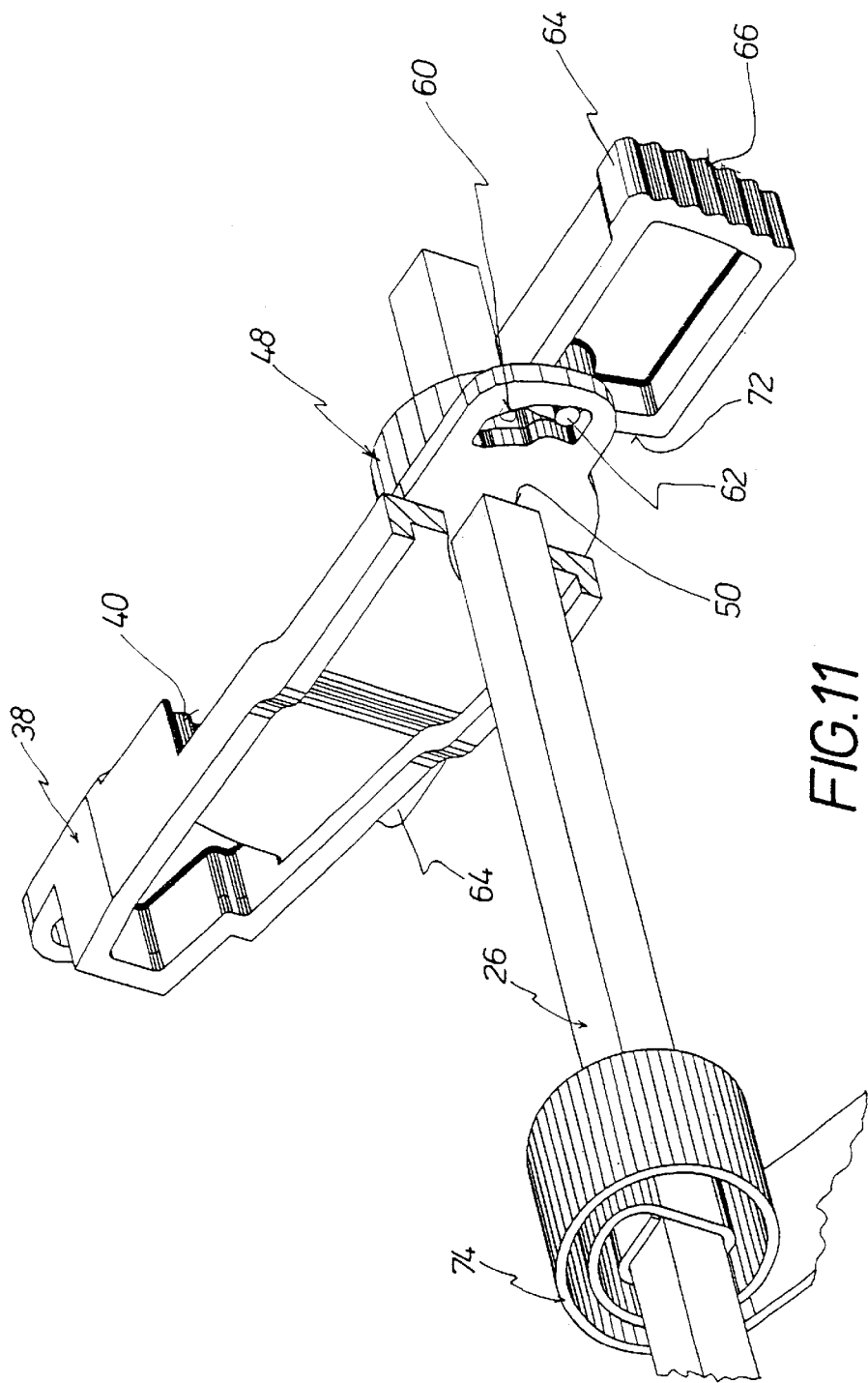
Figure 12:
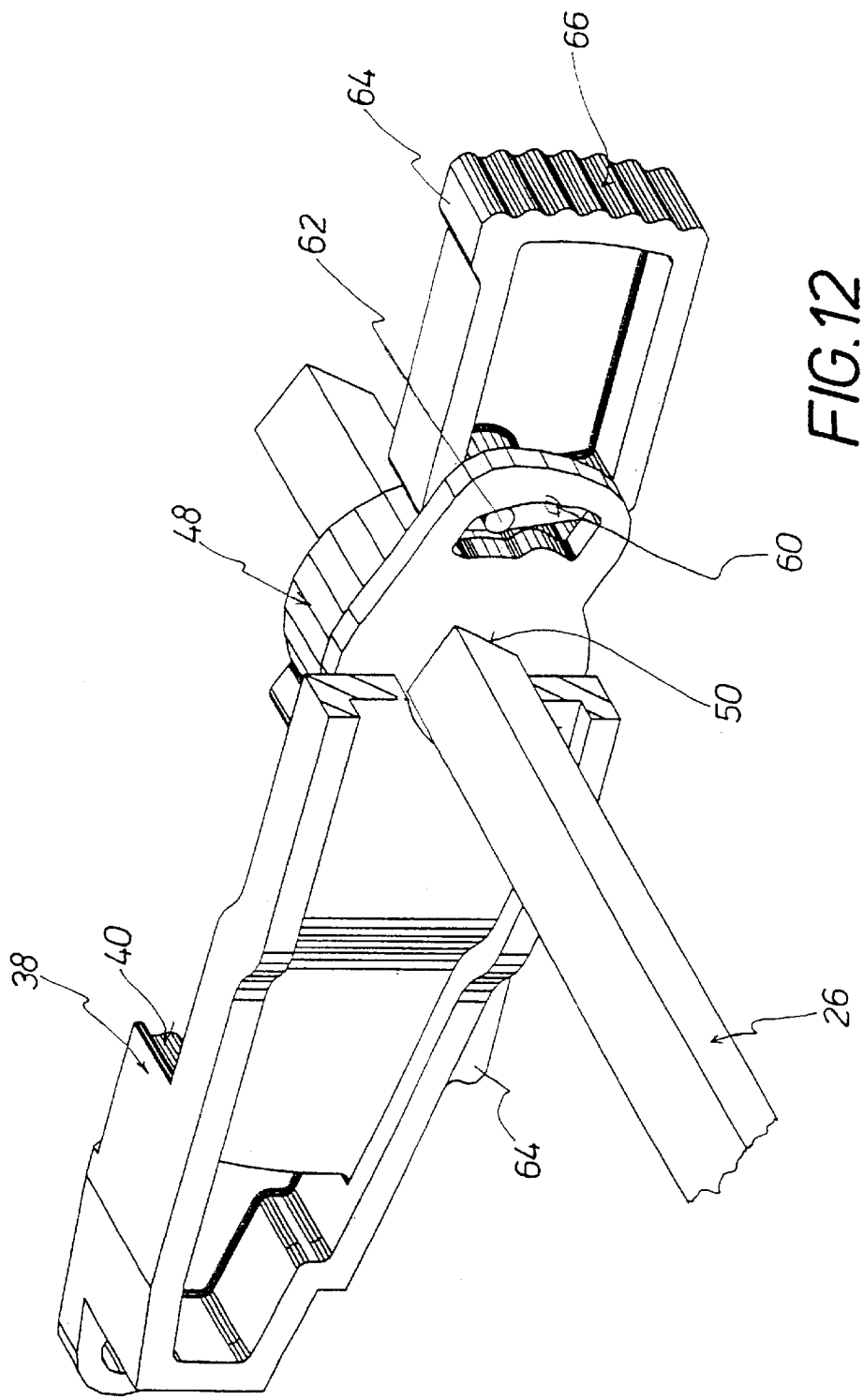
Figure 13:
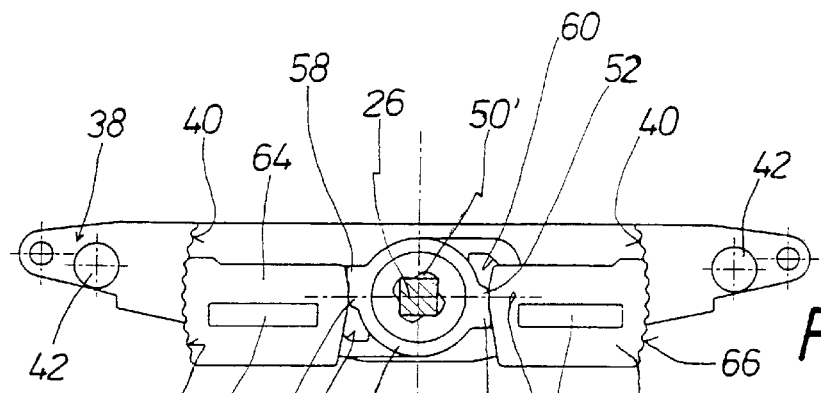
Figure 14:
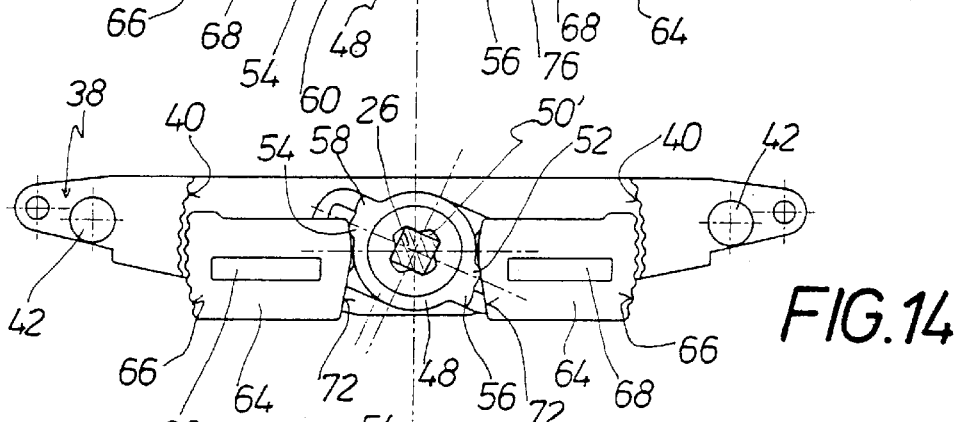
Figure 15:
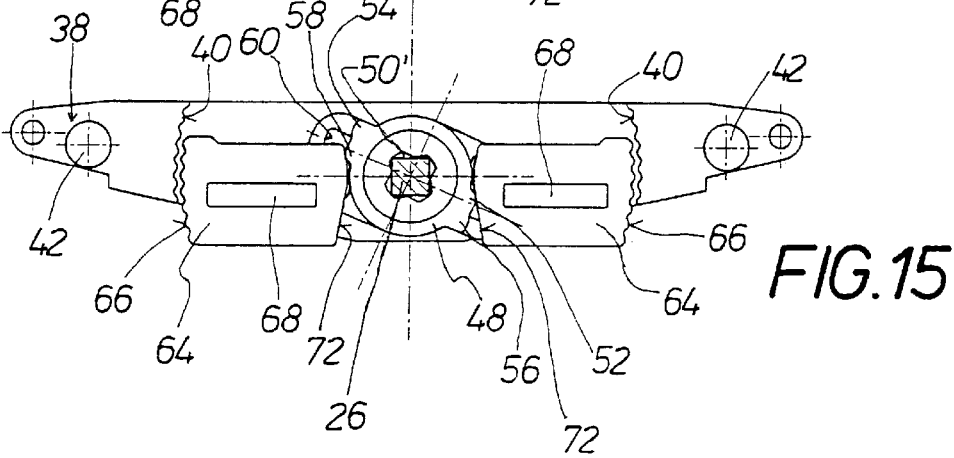

Further details, features and advantages will be apparent from the description hereinafter of an embodiment illustrated in the drawing of the adjusting apparatus for adjusting the inclination of a seat squab of a vehicle seat. In the drawing:

FIG. 1 shows a side view of a vehicle seat provided on a seat springing arrangement, with an adjusting apparatus for adjusting the inclination of the seat squab of the vehicle seat relative to the seat springing arrangement, FIG. 2 shows a diagrammatic side view of the inclination adjusting apparatus shown in FIG. 1, FIG. 3 shows a side view of an embodiment of the adjusting apparatus in a horizontal position, FIG. 4 shows a side view corresponding to FIG. 3, with the upper rocker element in a forwardly downwardly inclined position, FIG. 5 shows a side view of the adjusting apparatus without associated rocker in the position illustrated in FIG. 3, FIG. 6 shows a side view similar to FIG. 5 wherein the locking member and the toothed sliders are shown in their release and adjusting position, FIG. 7 shows a perspective view of the adjusting apparatus corresponding to FIG. 5, wherein the toothed sliders are shown in meshing latching engagement by means of the locking member with the bridge tooth arrangements of the toothed bridge, that is to say showing the adjusting apparatus in its locking position, FIG. 8 is a perspective view of the adjusting apparatus, similar to the view shown in FIG. 7, wherein the toothed sliders are out of engagement from the bridge tooth arrangements of the toothed bridge, that is to say the adjusting apparatus—as in FIG. 6—is shown in its release and adjusting position, FIG. 9 shows a side view of the adjusting apparatus in the locking position—as in FIGS. 5 and 7—but from the other side, that is to say from the rear, FIG. 10 shows a rear side view similar to FIG. 9 of the adjusting apparatus in its release and adjusting position—similarly to the views in FIGS. 6 and 8—, FIG. 11 shows a perspective, partly cut-away view of the adjusting apparatus in its locking position, FIG. 12 shows a view corresponding to FIG. 11 of the adjusting apparatus in its release and adjusting position, FIG. 13 shows a side view similar to FIG. 5 of the adjusting apparatus with a modified locking member in the locking position, FIG. 14 shows a side view corresponding to FIG. 13 of the adjusting apparatus in its release and adjusting position, and FIG. 15 shows a release and adjusting position corresponding to FIG. 14 on the other side of a vehicle seat, which is in opposite relationship to the adjusting apparatus shown in FIG. 14.

FIG. 1 shows a side view of a vehicle seat 10 comprising a seat squab 12 and a backrest 14. The vehicle seat 10 is arranged on a seat springing arrangement 16. Provided between the seat squab 12 and the seat springing arrangement 16 is an adjusting apparatus 18, hereinafter referred to as the adjusting device, for adjusting the inclination of the seat squab 12 of the vehicle seat 10. The adjusting device 18 is described in greater detail hereinafter with reference to FIGS. 3 and 4 or FIGS. 5 through 12 respectively and with reference to FIGS. 13 through 15.

The adjusting device 18 which has a rocker 20 is diagrammatically illustrated in FIGS. 1 and 2. The rocker 20 has an upper rocker element 22 and a lower rocker element 24 which are pivotable with each other about a common rotary axis 26 with respect to each other in order as desired to be able to adjust the inclination of the seat squab 12 of the vehicle seat 10 in small angular steps.

FIGS. 3 and 4 show the adjusting device 18 in a horizontal position and in a forwardly downwardly inclined position of the upper rocker element 22 in relation to the lower rocker element 24, which are in the form of sheet metal parts. The upper rocker element 22 has a base surface portion 28 and two leg portions 30 which are remote from each other and which project downwardly from the base surface portion 28. In a corresponding manner the lower rocker element 24 has a base surface portion 32 and leg portions 34 which project upwardly from the base surface portion 32. The leg portions 30 and 34 are pivotably movably connected together by bearing bushes 36.

Fixed to the upper rocker element 22 is a toothed bridge 38 which is shown in FIGS. 5 through 8 from one side, in FIGS. 9 and 10 diagrammatically from the opposite side, in portion-wise manner in FIGS. 11 and 12 and in FIGS. 13 through 15 and in FIGS. 5 and 6 from the one side. The toothed bridge 38 is provided with tooth arrangements 40 which are disposed concentrically in relation to the rotary axis 26 which extends non-rotatably through the bearing bushes 36.

Centering projections 42 project from the toothed bridge 38. The upper rocker element 22 is provided at the corresponding leg portion 30 with holes 44 into which the centering projections 42 protrude without play. That provides for precise positioning of the toothed bridge 38 on the upper rocker element 22. The toothed bridge 38 is fixed to the above-mentioned leg portion 30 of the upper rocker element 22 by means of fixing elements 46 which are spaced from the centering projections 42 and which are for example rivets.

A locking portion 48, referred to hereinafter as the locking member, is non-rotatably mounted to the rotary axis 26 which is of a cross-section that differs from a circular shape, that is to say, in the embodiment of the adjusting device 18 shown in the drawings, a square cross-section. This means that the locking member 48 is provided with a through hole 50 whose internal cross-section is adapted without play to the cross-section of the rotary axis 26.

The locking member 48 is provided with noses 52, 54 and 56, 58—see for example FIGS. 5 and 6—which are disposed in diametrally opposite relationship. As is clearly apparent from FIGS. 9 and 10 the locking member 48 is also provided with diametrally oppositely disposed sliding guides 60 against which bear projections 62 which extend away from toothed sliders 64. The locking member 48 is disposed centrally between the two toothed sliders 64. Each of the two toothed sliders 64 is provided with a slider tooth arrangement 66. The slider tooth arrangements 66 and the tooth arrangements 40 of the toothed bridge 38 are provided with mutually corresponding, wave-shaped tooth profiles.

Each of the two toothed sliders 64 has a guide bar 68. The corresponding leg portion 34 of the lower rocker element 24 has two guide slots 70, into which the guide bars 68 of the toothed sliders 64 project. The guide slots 70 are longer than the guide bars 68. The width of the guide bars 68 and the width of the guide slots 70 are equal so that the toothed sliders 64 are linearly movably guided in relation to the lower rocker element 24.

Each of the two toothed sliders 64 has a back 72 which is towards the locking member 48 and against which the noses 52 and 54 of the locking member 48 bear in the release and adjusting position of the locking member 48 (see FIGS. 4, 6, 8, 12, 14 and 15) and against which the noses 52, 54 and 56, 58 bear in the locking position of the locking member 48, as can be seen from FIGS. 3, 5, 7 and 13.

Provided between the rotary axis 26 and the lower rocker element 24 is a spring element 74 which for example is in the form of a coil spring. The spring element 74 serves to urge the two toothed sliders 64 by means of the locking member 48 against the tooth arrangements 40 of the toothed bridge 38, that is to say the two toothed sliders 64 into their locking position. In that case the spring element 74 is mechanically stressed. To release the rocker member 20 for adjusting of the inclination of the seat squab 12 of the vehicle seat 10, the rotary axis 26 is suitably pivoted, in which case the two toothed sliders 64 are moved towards each other by virtue of the positively locking contact of their projections 62 against the sliding guides 60 of the locking member 48, that is to say the slider tooth arrangements 66 of the two toothed sliders 64 are released from the tooth arrangements 40 of the toothed bridge 38. In that release and adjusting position of the locking member 48 and the two toothed sliders 64, the seat squab 12 and thus the vehicle seat 10 can be adjusted in respect of its inclination as desired.

After the desired position of inclination is reached the rotary axis 26 which is desirably connected to an adjusting lever (not shown) is released. In that case, the mechanically stressed spring element 74 which is mechanically pre-stressed more greatly in the release and adjusting position can be relieved of stress again in order to cause the two toothed sliders 64 to latch again by way of the locking member 48 with the tooth arrangements 40 of the toothed bridge 38 in the desired position of inclination.

The backs 72 of the two toothed sliders 64 and the noses 52, 54 and 56, 58 of the locking member 48 are designed in mutually adapted fashion in such a way that the noses 52 and 54, in the locking position of the toothed sliders (see FIG. 5), lie on a straight operative line 76 which extends centrally through the rotary axis 26 and which extends parallel to the guide slots 70 or the guide bars 68 or which is disposed in coincident relationship therewith. That avoids external forces which are applied to the toothed bridge 38 by the rocker 20 and which by way of the tooth arrangements 40 of the toothed bridge 38 exert a force component on the slider tooth arrangements 66 of the two toothed sliders 64 being able to move the toothed sliders 64 out of the locking position.

The locking member 48 is mounted with a defined play on the rotary axis 26 and can thus compensate for possible tolerances for example at the tooth arrangements 40 of the toothed bridge 38 and/or at the slider tooth arrangements 66 of the two toothed sliders 64, by virtue of the freedom of movement thereof, which is governed by the play involved. In addition, the locking member 48 does not experience any rotational limitation in the direction of rotation of the release and adjusting position and, by virtue of the action of the spring element 74, that is to say by the action of the corresponding spring moment, it is capable, by way of the outwardly inclined noses 54, 56, of re-adjusting the backs 72, which are likewise inclined, of the two toothed sliders 64. That provides that, even after a long period of operation, any play which may possibly occur in the tooth arrangements 40 and/or in the slider tooth arrangements 66 is eliminated or at least reduced.

Identical features are identified in each of FIGS. 1 through 12 by the same references so that there is no need for all features to be described in detail in relation to all those Figures.

If a toothed bridge 38 is used both at the right and also at the left leg portion 30 of the upper rocker element 22 of the rocker 20 of the adjusting device 18, the two locking members 48 can be actuated by a common rotary axis 26. In that case, under certain conditions such as for example when the rocker 20 is subjected to twisting as a result of great external forces uneven engagement of the toothed sliders 64 can occur on the left-hand side and the right-hand side. As a result, if the locking members 48 are rigidly connected by way of the common rotary axis 26, that can result in 'latching beyond', beyond the position of inclination which is wanted by the seat occupant. In order to avoid such latching beyond that desired position of inclination, at least one of the two locking members 48 can be provided with a through hole 50' whose internal cross-section is adapted to the cross-section of the rotary axis 26 in such a way that a limited angular rotary movement of the rotary axis 26 relative to the locking member 48 is possible. FIGS. 13, 14 and 15 show such a configuration of the through hole 50', which permits limited angular rotary movement of the rotary axis 26 relative to the locking member 48.

The same features are also identified in FIGS. 13 through 15 by the same references as in FIGS. 1 through 12 so that there is no need for all those features to be described in detail once again with reference to FIGS. 13 through 15.

What is claimed is:

1. An apparatus for adjusting the inclination of a seat squab (12) of a vehicle seat (10), comprising:

a rocker (20) having an upper rocker element (22) and a lower rocker element (24) which are pivotably movably connected together by lateral bearing bushes (36), a toothed bridge (38) fixed to the upper rocker element (22), said toothed bridge (38) having two mutually oppositely disposed bridge tooth arrangements (40) which are concentric with respect to the bearing bushes (36), two toothed sliders (64) provided between said two bridge tooth arrangements (40) of said toothed bridge (38), each of said two toothed sliders (64) having slider tooth arrangements (66) facing away from each other, a locking member (48) provided between the two toothed sliders (64), said locking member (48) being rotatable about a rotary axis (26), said rotary axis (26) extending through the bearing bushes (36) wherein the two toothed sliders (64) are linearly movably guided on the lower rocker element (24) between a locking position of engaging into the bridge tooth arrangements (40) and a release and adjusting position spaced from the bridge tooth arrangements (40), wherein the locking member (48) is provided for adjustment of the two toothed sliders (64) between the release and adjusting position and the locking position, a prestressed spring element (74) provided between the rotary axis (26) and the lower rocker element (24), wherein said prestressed spring element (74) urges the two toothed sliders (64) into the locking position, wherein each of the two toothed sliders (64) has a back (72) disposed toward the locking member (48), and the locking member (48) has diametrically mutually opposite noses (52, 54, 56, 58) which abut the back (72), and wherein the backs (72) of the toothed sliders (64) and the noses (52, 54, 56, 58) of the locking member (48) are arranged such that the noses (52, 54) in the locking position of the toothed sliders (64) lie on a straight operative line (76) which extends through the rotary axis (26), and at least two guide bars (68), wherein the lower rocker element (24) is provided with at least two guide slots (70) which are aligned with each other in a line and said two toothed sliders (64) for adjustment thereof between the locking position and the release and adjusting position are provided with said at least two guide bars (68) which are linearly movably guided in said at least two guide slots (70).

2. The apparatus of claim 1, wherein the upper rocker element (22) and the lower rocker element (24) are formed from sheet metal.

3. The apparatus of claim 1, and further comprising at least two centering projections (42) and at least two fixing elements (46), wherein said toothed bridge (38) is centered on said upper rocker element (22) by said centering projections (42) and fixed by means of said fixing elements (46) spaced therefrom.

4. The apparatus of claim 1, wherein said bridge tooth arrangements (40) of said toothed bridge (38) and said slider tooth arrangements (66) of the toothed sliders (64) have wave-shaped tooth profiles.

5. The apparatus of claim 1, wherein each of said two toothed sliders (64) includes a respective projection (62) wherein each respective projection (62) extends away from each of the two toothed sliders (64) and the locking member (48) includes diametrically oppositely disposed sliding guides (60) whereby said two toothed sliders (64) are displaceable upon release displacement of the locking member (48) by the projections (62) against the force of the spring element (74) from the locking position into the release and adjusting position.

6. The apparatus of claim 1, wherein the rotary axis (26) has a non-circular section.

7. The apparatus of claim 1, wherein the locking member (48) has a through hole (50) whose internal cross-section is adapted to the cross-section of the rotary axis (26).

8. The apparatus of claim 1, wherein the locking member (48) has a through hole (50) whose internal cross-section is adapted to the cross-section of the rotary axis (26) such that there is provided a limited angular rotary movement of the rotary axis (26) relative to the locking member (48).

* * * * *